(12) United States Patent
Bruckert et al.

(10) Patent No.: US 8,080,746 B2
(45) Date of Patent: Dec. 20, 2011

(54) HIGH-VOLTAGE CIRCUIT BREAKER AND SWITCH ARRANGEMENT

(75) Inventors: Michael Bruckert, Ruemlang (CH); Dieter Fuechsle, Endingen (CH); Martin Zuercher, Buchs (CH); Mara Treglia, Zurich (CH)

(73) Assignee: ABB Technology AG, Zurich (CH)

( * ) Notice: Subject to any disclaimer, the term of this patent is extended or adjusted under 35 U.S.C. 154(b) by 119 days.

(21) Appl. No.: 12/111,418

(22) Filed: Apr. 29, 2008

(65) Prior Publication Data
US 2008/0217152 A1  Sep. 11, 2008

Related U.S. Application Data

(63) Continuation of application No. PCT/CH2005/000641, filed on Nov. 2, 2005.

(51) Int. Cl.
*H01H 31/00* (2006.01)
(52) U.S. Cl. .................................... 200/48 P; 200/48 R
(58) Field of Classification Search ................. 200/48 P
See application file for complete search history.

(56) References Cited

U.S. PATENT DOCUMENTS

| | | | |
|---|---|---|---|
| 3,258,524 A | 6/1966 | Walling et al. | |
| 4,016,382 A | 4/1977 | Roth | |
| 5,103,111 A * | 4/1992 | Tobin et al. ................. | 307/130 |
| 5,313,106 A * | 5/1994 | Swanson ..................... | 307/130 |
| 5,796,060 A | 8/1998 | Fuchsle et al. | |
| 5,841,629 A | 11/1998 | Jeske et al. | |
| 6,624,360 B2 | 9/2003 | Meinherz | |
| 2002/0012225 A1 | 1/2002 | Matsushita et al. | |
| 2006/0283842 A1 | 12/2006 | Pavlovic et al. | |
| 2007/0017904 A1 | 1/2007 | Meinherz | |
| 2008/0105654 A1* | 5/2008 | Bruchmann et al. .......... | 218/152 |

FOREIGN PATENT DOCUMENTS

| | | |
|---|---|---|
| DE | 24 27 451 A1 | 5/1975 |
| DE | 29 29 054 A1 | 1/1980 |
| DE | 196 41 391 C1 | 2/1998 |
| DE | 100 13 232 A1 | 9/2001 |
| DE | 100 11 888 A1 | 10/2001 |
| DE | 100 32 656 A1 | 1/2002 |
| DE | 103 25 681 B3 | 10/2004 |
| DE | 103 25 684 A1 | 12/2004 |
| EP | 0 735 637 A2 | 10/1996 |
| EP | 0 744 758 A2 | 11/1996 |
| EP | 1 249 910 A2 | 10/2002 |
| EP | 1 569 254 A1 | 8/2005 |

OTHER PUBLICATIONS

Form PCT/ISA/210 (International Search Resort) dated Jul. 13, 2006.
Form PCT/ISA/237 (Written Opinion of the International Searching Authority) dated Jul. 13, 2006.

* cited by examiner

*Primary Examiner* — Renee Luebke
*Assistant Examiner* — Lheiren Mae Caroc
(74) *Attorney, Agent, or Firm* — Buchanan Ingersoll & Rooney PC

(57) ABSTRACT

The disclosure relates to an electrical switching device, e.g., a high-voltage switch, with a mantle-side electrical connection. According to the disclosure, an encapsulated angle disconnector is fitted between the mantle-side electrical connection and the outdoor bushing or an outgoing cable, by means of which angle disconnector the electrical connection is deflected in the disconnector plane, e.g., toward the vertical in the operating position of the switching device. Exemplary embodiments relate, inter alia, to: a horizontal electrical connection and a, 90° disconnector; an additional tilting angle (β) of the angle disconnector about the disconnector input axis; a plurality of mantle-side horizontal electrical connections with associated angle disconnectors, which are tilted away from one another.

45 Claims, 13 Drawing Sheets

HIGH-VOLTAGE CIRCUIT BREAKER AND SWITCH ARRANGEMENT

RELATED APPLICATION

This application claims priority as a continuation application under 35 U.S.C. §120 to PCT/CH2005/000641 filed as an International Application on Nov. 2, 2005 designating the U.S., the entire content of which is hereby incorporated by reference in its entirety.

TECHNICAL FIELD

The disclosure relates to the field of high-voltage engineering, e.g., of circuit breakers in electrical energy distribution systems. It is based on an electrical switching device and a switching device arrangement.

BACKGROUND INFORMATION

The disclosure is based on the prior art in accordance with DE 24 27 451. This document discloses a gas-insulated hybrid switch with outdoor bushings which can be pivoted for transport purposes. The bushings can be attached to the mantle of the circuit breaker on electrical connection flanges which are arranged laterally (horizontally) or at the top (vertically). In addition, an end-side electrical connection can be provided. With this circuit breaker, the two mantle-side electrical connections are arranged in a common plane through the switch axis. Optionally, disconnectors can be provided in the switch housing.

DE 29 29 054 A1 has disclosed multi-chamber circuit breakers which have end-side electrical connections for an, outdoor bushing which is guided away vertically and on a gas-insulated busbar which is guided away horizontally. Linear disconnectors are flange-connected to the outgoing feeders via intermediate modules.

In DE 100 13 232 A1, two polyphase-encapsulated circuit breakers are arranged horizontally and are provided with mantle-side electrical connection flanges which lie at the top on the tank, the electrical connections or their mid-axes again lying in, a common vertical longitudinal plane through the switch axis and being guided away vertically upwards. A 90°-angled module with a disconnector and grounding switch function is positioned on the GIS-side electrical connection. The electrical connection is deflected into the horizontal by means of the right-angled disconnector and can therefore be connected to the horizontally lying GIS busbar.

DE 100 11 888 A1 discloses an H circuit comprising five groups of in each case three parallel circuit breakers for a three-phase high-voltage switchgear assembly. The circuit breakers are arranged horizontally and have electrical connections or electrical connection flanges which are guided out vertically upwards and are guided away upwards outdoors and are deflected on the GIS side via right-angled disconnectors into the horizontal. The circuit breakers can also be provided with an end-side electrical connection on the GIS side, with all of the GIS-side modules of the assembly being arranged in a common horizontal plane.

DE 100 32 656 A1 has disclosed a horizontal "dead tank breaker" with two mantle-side connectors. The connectors are arranged in the vertical longitudinal plane through the switch axis and their flange plane runs horizontally. Two outdoor bushings are positioned, via arcuate base parts, onto the connection flanges in such a way that the bushings are guided away from one another upwards and in the form of a V in a vertical longitudinal plane. The connectors can also be uniformly aligned horizontally, with the result that their flange plane runs vertically. In this case, the first connector is connected to a gas-insulated switchgear assembly (GIS) and the second connector is connected via an outdoor bushing to an overhead line or a transformer. The outdoor bushing is in this case guided out of the horizontal with the aid of the arcuate base part and guided away upwards at an angle in a vertical plane (transverse plane) which is at right angles with respect to the switch axis.

EP 0 744 758 A2 has disclosed a circuit breaker with mantle-side electrical connections for outgoing cables, which electrical connections are guided upwards in slightly divergent fashion. Outgoing-feeder switch disconnectors are provided in the outgoing cables. The two electrical connections associated with one phase or their mid-axes are arranged on the circuit breaker housing in each case in a common plane through the switch axis (longitudinal plane). A three-phase switching device is realized by three circuit breakers being arranged longitudinally next to one another and being single-phase-encapsulated or three-phase-encapsulated. In both cases, the planes of the electrical connections or outgoing cables for the outer phases are tilted outwards about the switch axes through approximately 45° from the vertically oriented plane of the electrical connections of the central phase.

DE 103 25 681 B3 specifies a gas-insulated hybrid switching device, in which the longitudinal axis of the circuit breaker is arranged so as to deviate from the horizontal and vertical at an angle of 45°. A first electrical connection flange is provided on the end side and a second and third electrical connection flange are provided on the circuit breaker on the mantle side. All of the electrical connections or their mid-axes are arranged in a common vertical plane through the switch axis (longitudinal plane). In this case, the second, mantle-side electrical connection is deflected upwards into the vertical via an elbow-shaped flange or via an elbow-shaped connecting piece, and the third, mantle-side electrical connection is guided way radially with respect to the longitudinal axis of the circuit breaker. As a result, outdoor bushings can be guided away upwards in such a way that they are symmetrically compartmentalized at the electrical connections. Linear disconnectors are provided in the outdoor bushings.

DE 103 25 684 A1 specifies a related gas-insulated hybrid switching device, in which in turn the switch longitudinal axis points upwards at an angle and a first end-side and a second mantle-side electrical connection flange for outdoor bushings are provided.

EP 1 249 910 A1 has disclosed a horizontally arranged, three-phase-encapsulated or single-phase-encapsulated high-voltage circuit breaker, which has two mantle-side electrical connections which point vertically upwards to form a GIS double busbar and two end-side electrical connections for the outgoing feeder of cables, overhead lines or transformers.

EP 0 735 637 B1 has disclosed a horizontally arranged, three-phase-encapsulated or single-phase-encapsulated circuit breaker with an integrated three-position disconnector. The two disconnector outgoing feeders are guided away upwards in the form of a V on the mantle side in a plane at right angles with respect to the switch longitudinal axis (transverse plane). Further components and also outgoing-feeder disconnectors are arranged in the switch housing.

In the case of the mentioned circuit breakers with gas-insulated housing ("dead tank breaker", outdoor GIS hybrid switch, GIS switch), outdoor bushings in principle need to be guided away upwards. In the mentioned prior art, this takes place either directly via electrical connections which are positioned at the top on the mantle side and point substantially vertically upwards or indirectly via electrical connections which are horizontal on the end side or horizontal on the mantle side and are deflected upwards out of the horizontal through 90° or possibly 45° via additional deflection modules.

EP 1 569 254 has disclosed an encapsulated combination disconnector with optional disconnector and/or grounding switch functions.

SUMMARY

The present disclosure relates to a gas-insulated switching device and a switch arrangement with such a switching device which is more compact in size and has a simpler design and can be matched in a flexible manner to various switching arrangements.

An electrical switching device for an electrical energy supply system is disclosed, e.g., high-voltage switch, comprising a circuit breaker, which is arranged in a housing, which extends along a longitudinal axis, the housing having at least one mantle-side electrical connection on its mantle face, which electrical connection is used for connecting an outgoing feeder and has a mid-axis, which, in the operating position of the switching device, has a horizontal component, i.e. is not vertical, an encapsulated angle disconnector, whose input axis on the electrical-connection side is positioned parallel to the mid-axis and whose output axis on the outgoing-feeder side is positioned parallel to a longitudinal axis of the outgoing feeder, being fitted between the mantle-side electrical connection and the outgoing feeder, and, in addition, a disconnector plane being defined by the input axis and the output axis, and a disconnector angle α being enclosed between the input axis and the output axis, through which angle the electrical connection is deflected in the operating position of the switching device in the disconnector plane. The electrical connection can be implemented by means of a connector on the housing and can be in the form of a flange on the housing. The term disconnector is in this case understood to include any switching device by means of which the outgoing feeder can be disconnected and/or connected to ground. By means of the disclosure, an outgoing feeder which can be disconnected and/or connected to ground is therefore provided on an encapsulated circuit breaker via a mantle-side, non-vertical output on the housing mantle in extremely space-saving manner.

BRIEF DESCRIPTION OF THE DRAWINGS

In the schematic drawings.

The same reference symbols have been used in the figures for identical parts, and the reference signs for repeated parts have sometimes been omitted.

DETAILED DESCRIPTION

An exemplary embodiment can have encapsulated intermediate modules, such as ball deflection pieces, angular pieces or the like, which have until now been required can be omitted and nevertheless a disconnector function and/or grounding switch function at the outgoing feeder is realized.

Other exemplary embodiments can have the advantage that, by means of the angle disconnector, at the same time advantageous outgoing-feeder angles of outdoor bushing and outgoing cables can be realized.

Other exemplary embodiments can have the advantage that, by matching position and disconnector angles for each mantle-side position of the electrical connection, the longitudinal axis of the outgoing feeder can be guided away out of the horizontal upwards in the case of outdoor bushings and downwards in the case of outgoing cables with a sufficient gradient.

Yet another exemplary embodiment can have the advantage that the rotation angle β provides an additional degree of freedom by means of which an outdoor bushing can be connected with a high degree of flexibility to overhead lines and the like or an outgoing cable in any desired outgoing-feeder direction even on a mantle-side outgoing feeder on the circuit breaker housing.

Other exemplary configurations can include a plurality of outdoor outgoing feeders and/or outgoing cables, which are flange-connected to the circuit breaker.

Particularly cost-effective is the use, e.g., of a standard combination disconnector with disconnector and/or grounding switch functions as the angle disconnector, optionally in a T shape, at the outdoor outgoing feeder or outgoing cable.

A switch arrangement is also disclosed, e.g., a 1½ switch arrangement, with a switch device as illustrated above.

Further exemplary embodiments, advantages and applications of the disclosure result from the description and the figures.

Figure 1A:
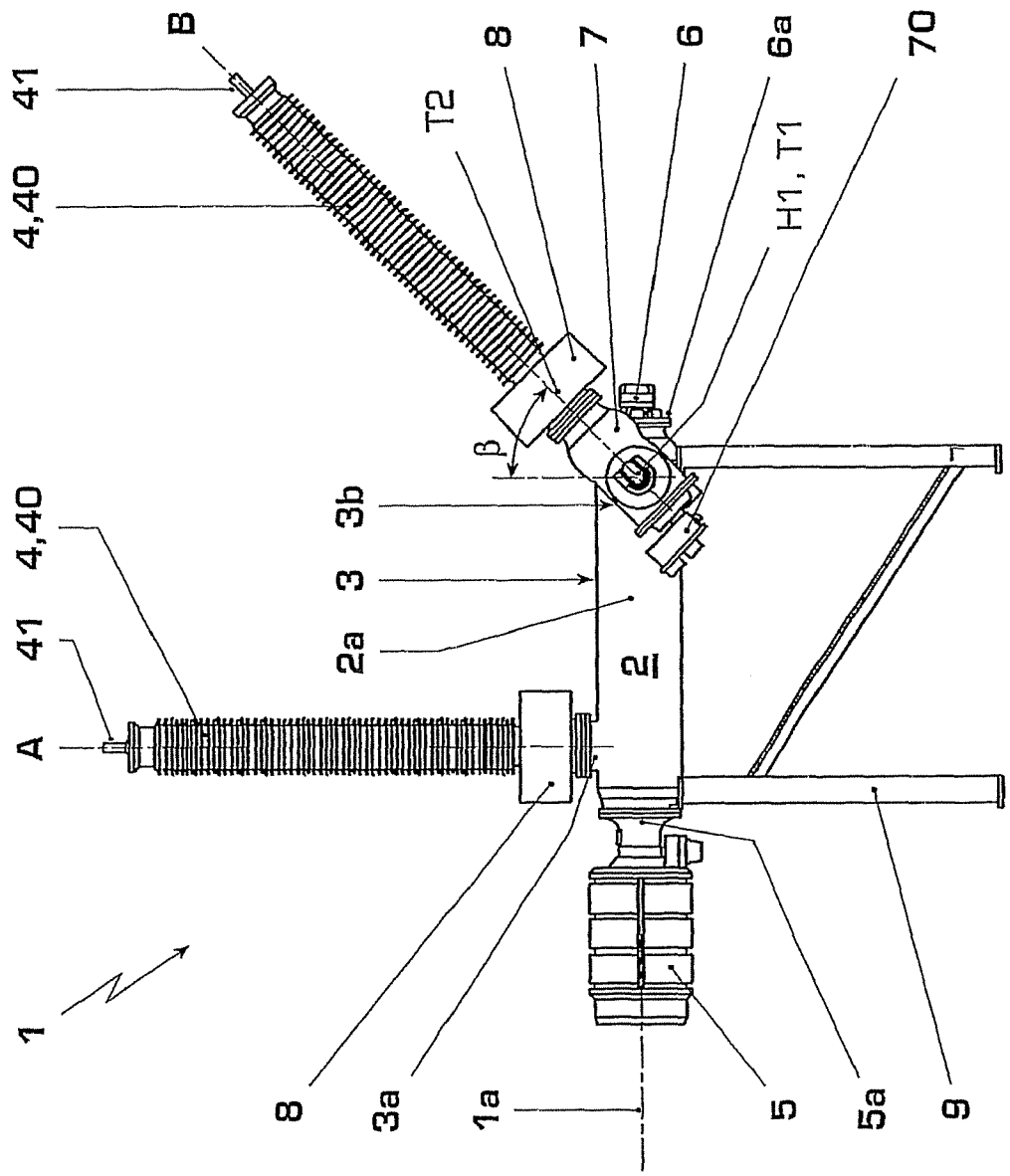
FIGS. 1a, 1b show a first embodiment of a switching device with a lateral flange-connection in accordance with the disclosure of an outdoor bushing in a side view and in a front view.
Figure 1B:
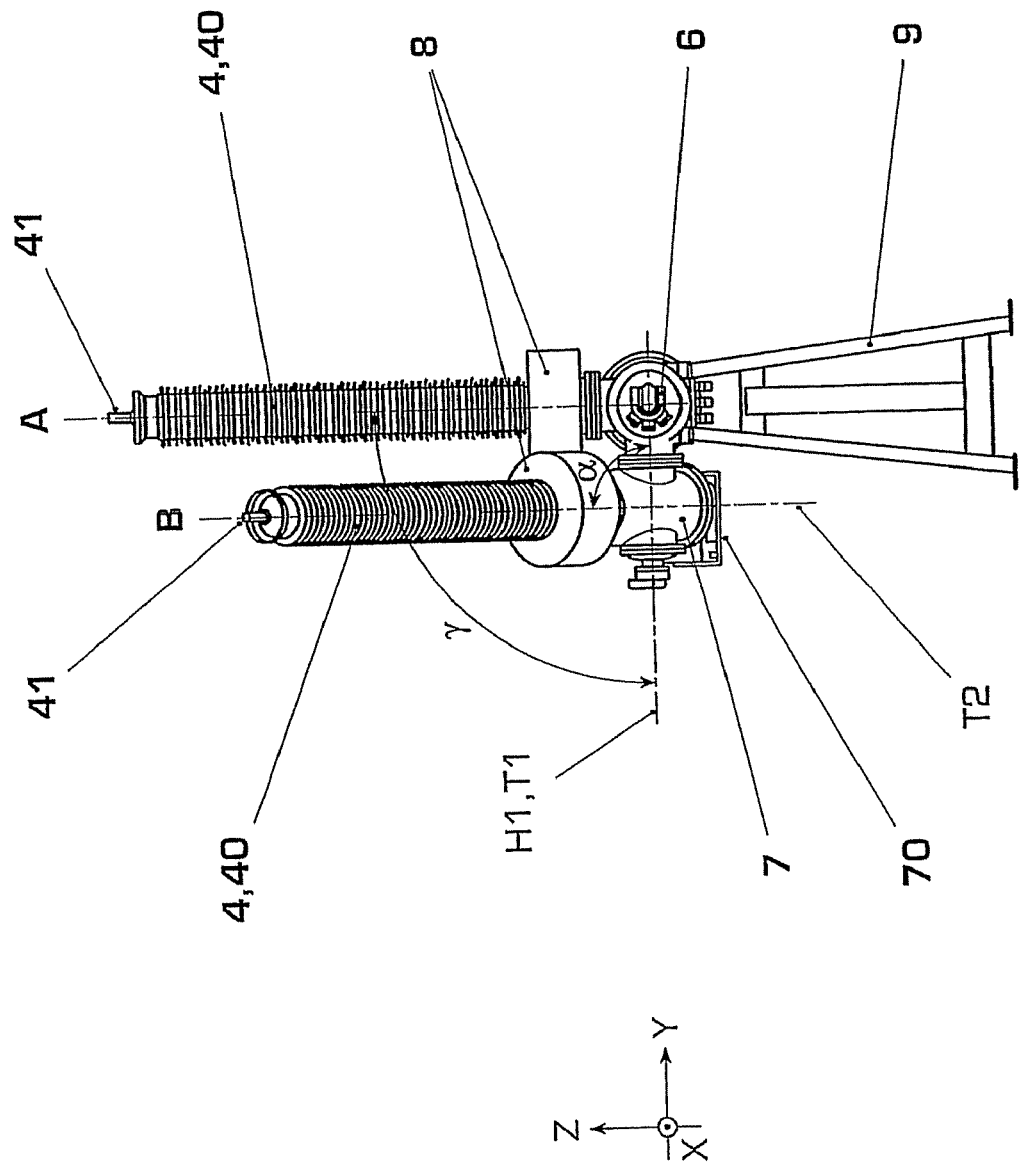

FIGS. 1a, 1b show, in simplified form, a first exemplary embodiment of a switching device 1, which accommodates a circuit breaker 2 in a housing 3, which extends along a central axis 1a, x. The housing 3 has, on its mantle face 2a, at least one mantle-side electrical connection 3b, which is used for connecting an outdoor bushing 4, 40. The outdoor outgoing feeder 4, 40 typically leads to an overhead line or to a transformer. In general, instead of an outdoor outgoing feeder 4, 40, an outgoing cable 4, 42 can always also be provided (FIG. 2c).

The electrical connection 3b has a mid-axis H1, which is guided away from the circuit breaker 2 and, in an operating position of the switching device 1, has a horizontal spatial component (lying in the x, y plane). Furthermore, an encapsulated angle disconnector 7 is provided, whose input axis T1 on the electrical connection side is parallel to the mid-axis H1 and whose output axis T2 on the bushing side is parallel to the longitudinal axis B of the outdoor bushing 4. In this case, any desired angle module with a disconnector and/or grounding switch function (angled combination disconnector) is referred to as an angle disconnector 7. A disconnector plane T12 is defined by the input axis T1 and the output axis T2, and a disconnection angle α is enclosed between the input axis T1 and the output axis T2. In accordance with the disclosure, the angle disconnector 7 is fitted between the mantle-side electrical connection 3b and the outgoing feeder 4 in such a way that the electrical connection 3b in the operating position of switching device 1 is deflected in the disconnector plane T12. In this way, a broad angle spectrum for guiding away outgoing feeders 4 to the outdoors or into cables is provided with the aid of the angle disconnector. Exemplary embodiments in this regard will be given below.

FIGS. 1a, 1b in addition illustrate: a high-voltage connection 40 at the end of the outdoor bushing 4; on the left-hand side an end-side connection flange 5a for connecting the switch 5 for the circuit breaker 2 (not illustrated in any more detail); on the right-hand side an end-side connection flange 6a with a pressure relief valve 6. A disconnector/grounding switch drive 70 is fitted on the angle disconnector 7. Furthermore, additional housing modules can be provided on the switching device 1, for example power converters 8 or voltage converters, deflection modules, connection modules, disconnector/grounding-switch modules, or the like, which are not illustrated.

The switching device 1 is fitted on a mounting frame 9, a concrete pedestal or the like. The switching device 1 can be a dead tank breaker 1, an AIS/GIS hybrid switch 1 or a GIS switch with an outdoor outgoing feeder or outgoing cable. The switching device 1 can accommodate any desired circuit breaker 2, for example a high-voltage circuit breaker 1 or possibly a heavy-duty switch or high-current circuit breaker or generator circuit breaker or the like. Typically, but not necessarily, the longitudinal axis 1a, x of the housing 3 is aligned horizontally. The cross-sectional profile of the housing 3 may be shaped so as to be entirely or partially round, oval, rectangular or polygonal.

Advantageously, the angle disconnector 7 of the lateral flange-connection of the outgoing feeder 4 in accordance with the disclosure is fitted directly and without the use of intermediate modules on the input side to the electrical connection 3b and on the output side to the outgoing feeder 4. As a result, an encapsulated connection between the electrical connection 3b and the outgoing feeder 4 is provided directly and without the use of intermediate modules.

Advantageously the electrical connection 3b, 3c, 3d is deflected through the disconnector a in the disconnector plane T12 towards the vertical. For example, the orientation, which is required for an outdoor outgoing feeder 4, 40, of the outdoor bushing longitudinal axis B is implemented towards the sky or for an outgoing cable 4, 42 towards the ground or possibly also towards the sky. In the case of a multi-story assembly, it is also possible for an outgoing feeder to be provided at the bottom for an outdoor bushing by means of being deflected towards the vertical.

In a further exemplary embodiment, the mid-axis H1 with the vertical encloses a position angle $\gamma$, the position angle $\gamma$ being in the range of $30°<\gamma<150°$, e.g., $60°<\gamma<120°$ and preferably $80°<\gamma<100°$, for example $\gamma=90°$. Furthermore, the disconnector angle $\alpha$ can be in the range of $30°<\alpha<150°$, e.g., $60°<\alpha<120°$ and preferably $80°<\alpha<100°$, for example $\alpha=90°$. For example, the disconnector angle $\alpha$ and the position angle $\gamma$ are matched to one another in such a way that the outgoing feeder 4 is guided away upwards or downwards towards the vertical through a maximum of 60°, e.g., a maximum of 45°, preferably a maximum of 30°.

Advantageously, in the event of an outgoing feeder with an outdoor bushing 4, 40, a, (numerical) sum of the disconnector angle $\alpha$ and the position angle $\gamma$ is selected to be in the range of $130°<\alpha+\gamma<230°$, e.g., $140°<\alpha+\gamma<220°$, preferably $150°<\alpha+\gamma<210°$ and can be selected to be equal to $\alpha+\gamma=180°$. As a result, an advantageous orientation of the outdoor bushing longitudinal axis B towards the sky at the top is achieved and at the same time good accessibility without any of the risks imposed by high voltages for operational personnel is achieved on the floor in the region of the switch.

Furthermore, in the case of an outgoing cable 4, 42, a, sum of the disconnector angle $\alpha$ and the position angle $\gamma$ can be in the range of $-50°<\alpha-\gamma<50°$, preferably $-40°<\alpha-\gamma<40°$, particularly preferably $-30°<\alpha-\gamma<30°$, for example $\alpha-\gamma=0°$ in order to guide the cable 43 (FIG. 2c) away downwards towards the ground.

In addition, the angle disconnector 7 can be fitted fixedly on the electrical connection 3b with a rotated orientation, it being possible for the rotation angle $\beta$ between a vertical reference plane and the disconnector plane T12 to be predetermined by the input axis T1. In this way, the outdoor bushing 4, 40 can be guided away upwards deviating from the vertical in the tilted disconnection plane T12 through the tilting angle $\beta$.

For example, the rotation angle $\beta$ can be in the range of $0°<|\beta|<70°$, preferably $0°<|\beta|<50°$, particularly preferably $0°<|\beta|<30°$. The rotation angle $\beta$ can be determined by the angular spacing on a pitch circle mounting flange on the electrical connection 3b and on the disconnector input flange. In the case of an outgoing cable 4, 42 at the bottom, the rotation angle $\beta$ can be in the range of $110°<|\beta|<180°$, preferably $130°<|\beta|<180°$, particularly preferably $150°<|\beta|<180°$.

As illustrated in the figures, the mid-axis H1 or H2 can be in the horizontal, and the disconnector angle $\alpha$ can be the range of $80°<\alpha<100°$, for example $\alpha=90°$. As a result, the outgoing feeder 4, namely the outdoor bushing 4, 40; B, C, D or the outgoing cable 4, 42; C, can be guided in the disconnector plane T12 at the top ($-70°<\beta<70°$) or at the bottom ($110°<|\beta|<180°$), with it being possible for the tilting movements about the rotation angle $\beta$ also to be added, and in particular the outgoing feeder 4 can be guided perpendicularly upwards ($\beta=0°$) or perpendicularly downwards ($\beta=\pm180°$).

In FIGS. 1a, 1b, in addition a mantle-side vertical connection 3a for a further outdoor bushing 4 with a longitudinal axis A or for an additional device is provided. As an alternative or in supplementary fashion, in addition at least one end-side connection for outdoor bushings or for additional devices can also be provided. As is shown by way of example in FIG. 2c, a rapid-response grounding switch 71 can also be provided between the angle disconnector 7 and the outgoing feeder 4, 42.

Figure 4A:
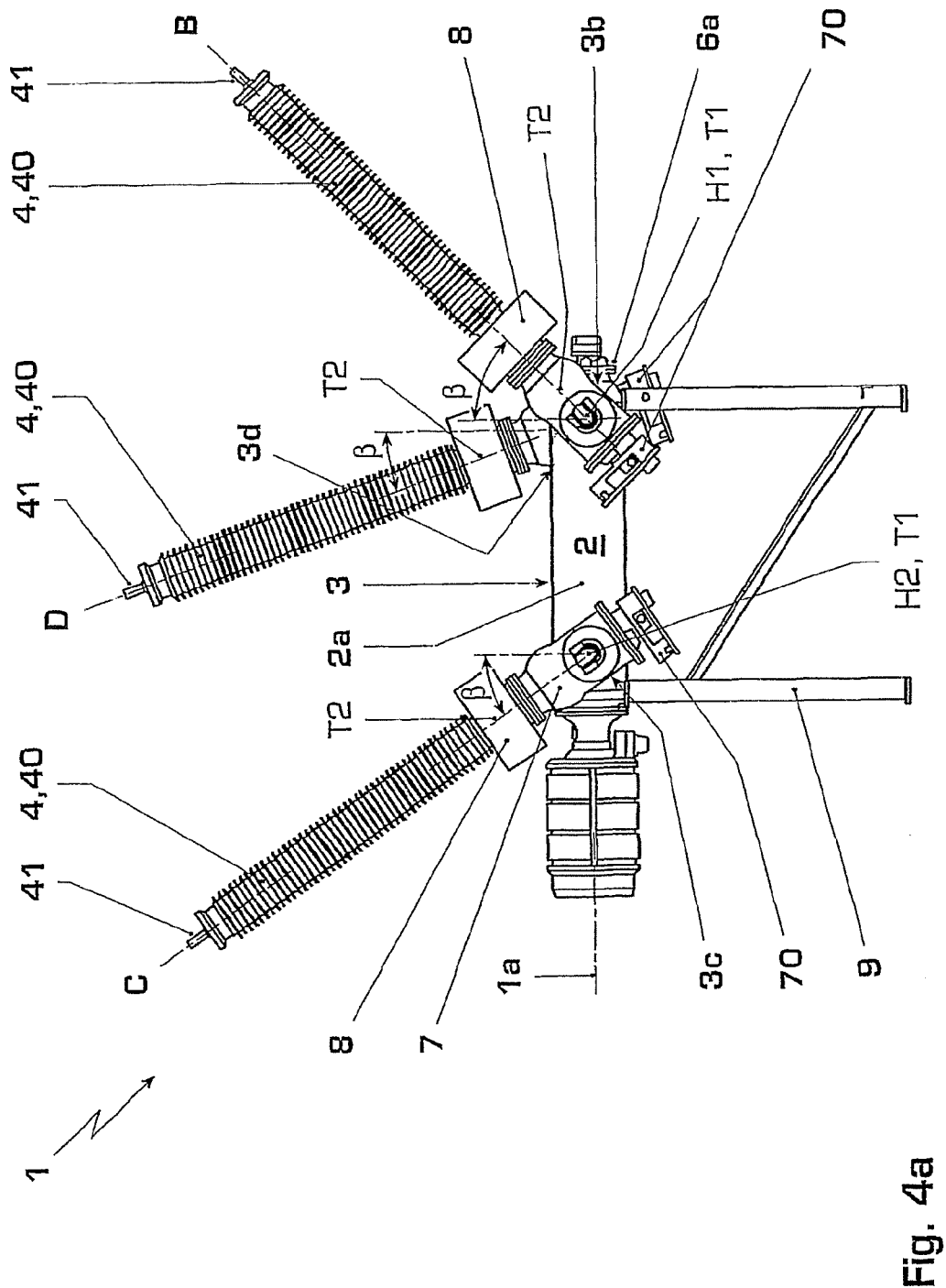
FIGS. 4a, 4b show a fourth embodiment of the switching device with lateral flange-connection on both sides and partially opposite one another of three outgoing feeders in a side view and in a plan view.
Figure 4B:
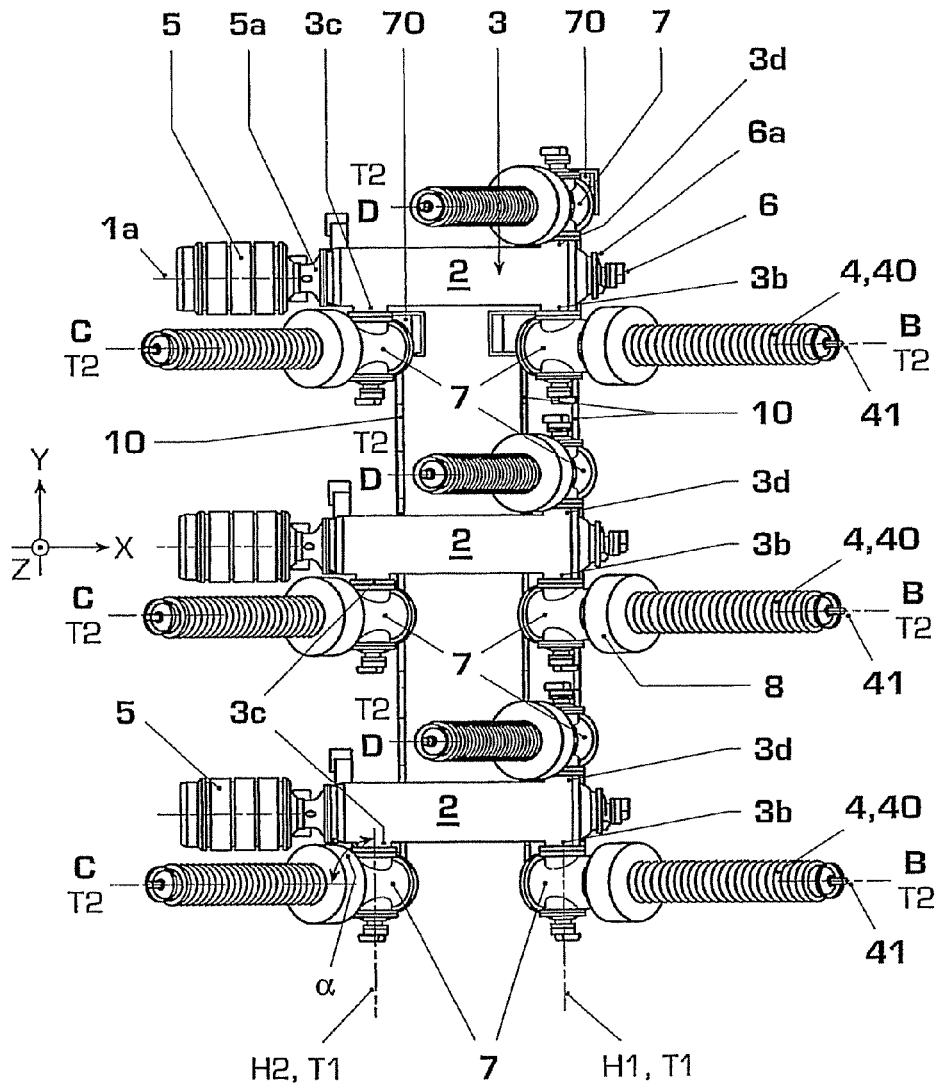

Advantageously, as illustrated in FIGS. 2a, 2b, 2c, 3, 4a, 4b and FIGS. 5a, 5b, 6, a plurality of mantle-side, non-vertical electrical connections 3b, 3c, 3d is provided which are each connected via angle disconnectors 7 directly to outdoor bushings 4, 40 or outgoing cables 42 which extend along the longitudinal axes B, C, D. The electrical connections 3b, 3c, 3d can be arranged in such a way that they are offset with respect to one another along the longitudinal axis 1a, x and/or with respect to a vertical longitudinal plane through the housing 3 of the switching device 1 on mutually opposite sides, e.g., opposite one another (FIGS. 3, 4a, 4b, 5a, 5b, 6). All that has been said above likewise applies to these outgoing feeders 4; 40, 42; B, C, D, which are connected on the mantle side laterally to electrical connections 3a, 3c, 3d. For example, the tilting angle $\beta$ can be different and preferably divergent for the bushings 4; B, C, D, for example $\beta=0°$ and $\beta<45°$ (FIGS. 2a, 2b) or in each case, for example, $|\beta|<45°$ with opposite rotation sense and mathematical sign (FIGS. 4a, 4b or else 5a, 5b, 6, 7).

Figure 2A:
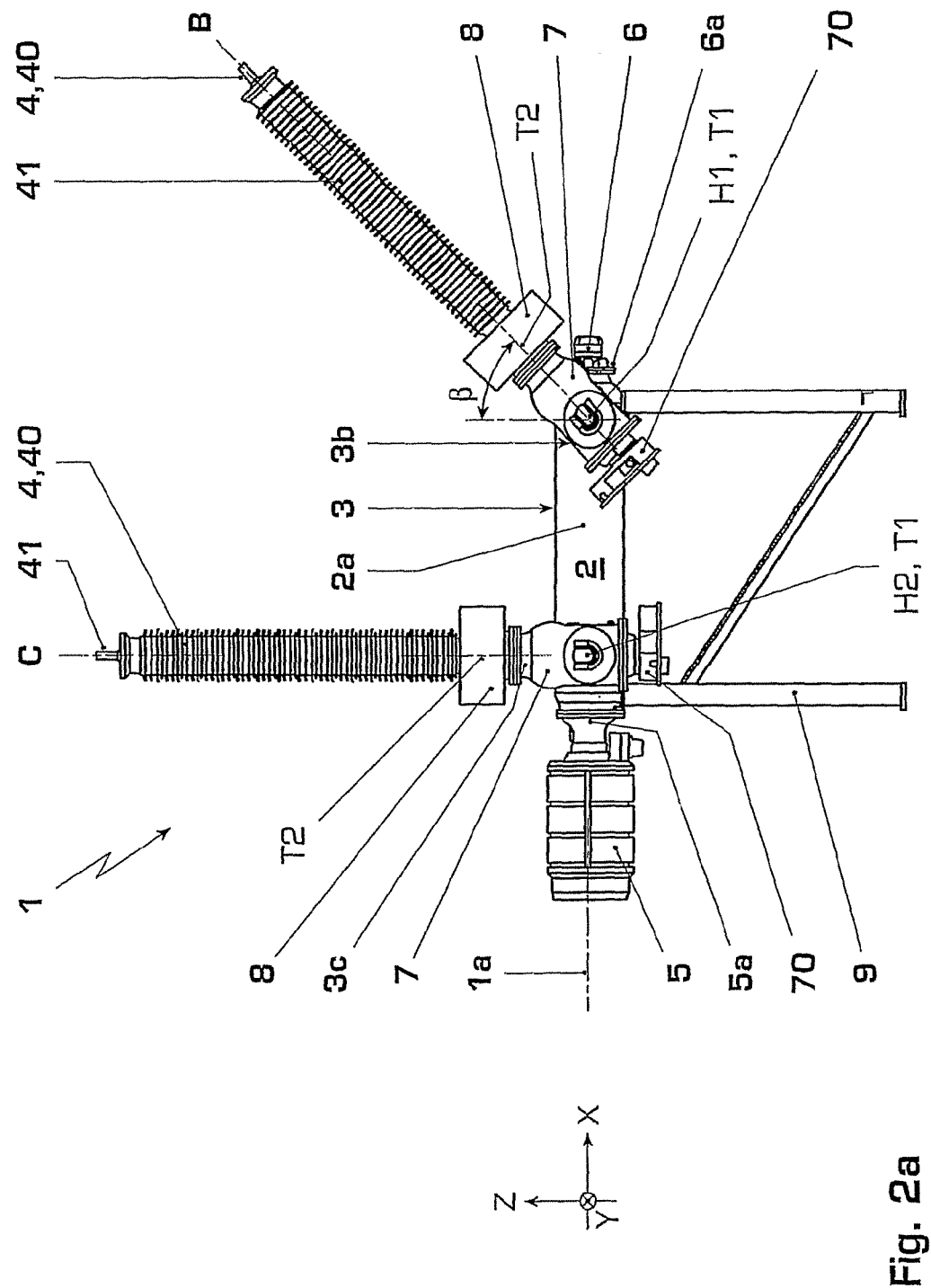
FIGS. 2a-2c show a second embodiment of the switching device with lateral flange-connection of two outgoing feeders (outdoor bushing and/or cable) in a side view and in a plane view.
Figure 2B:
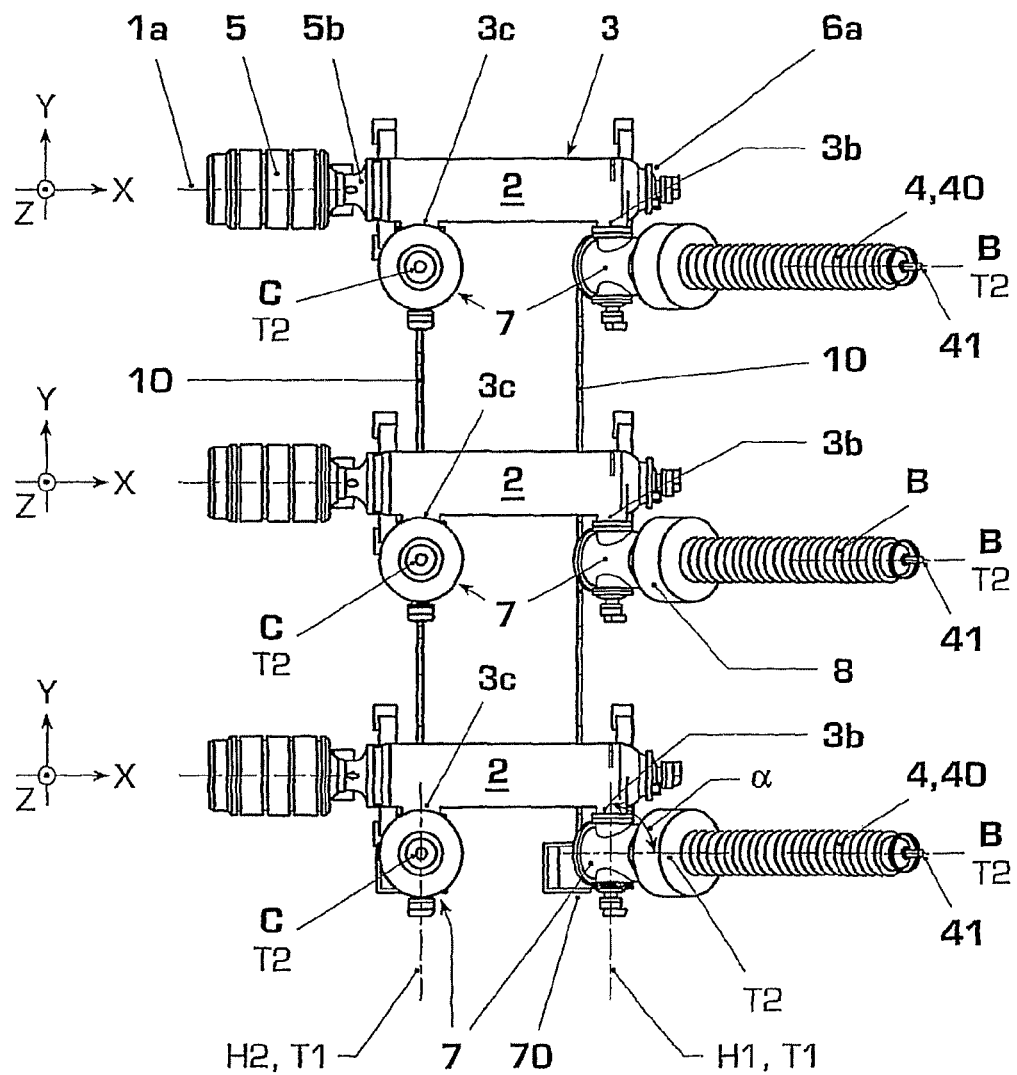
Figure 2C:
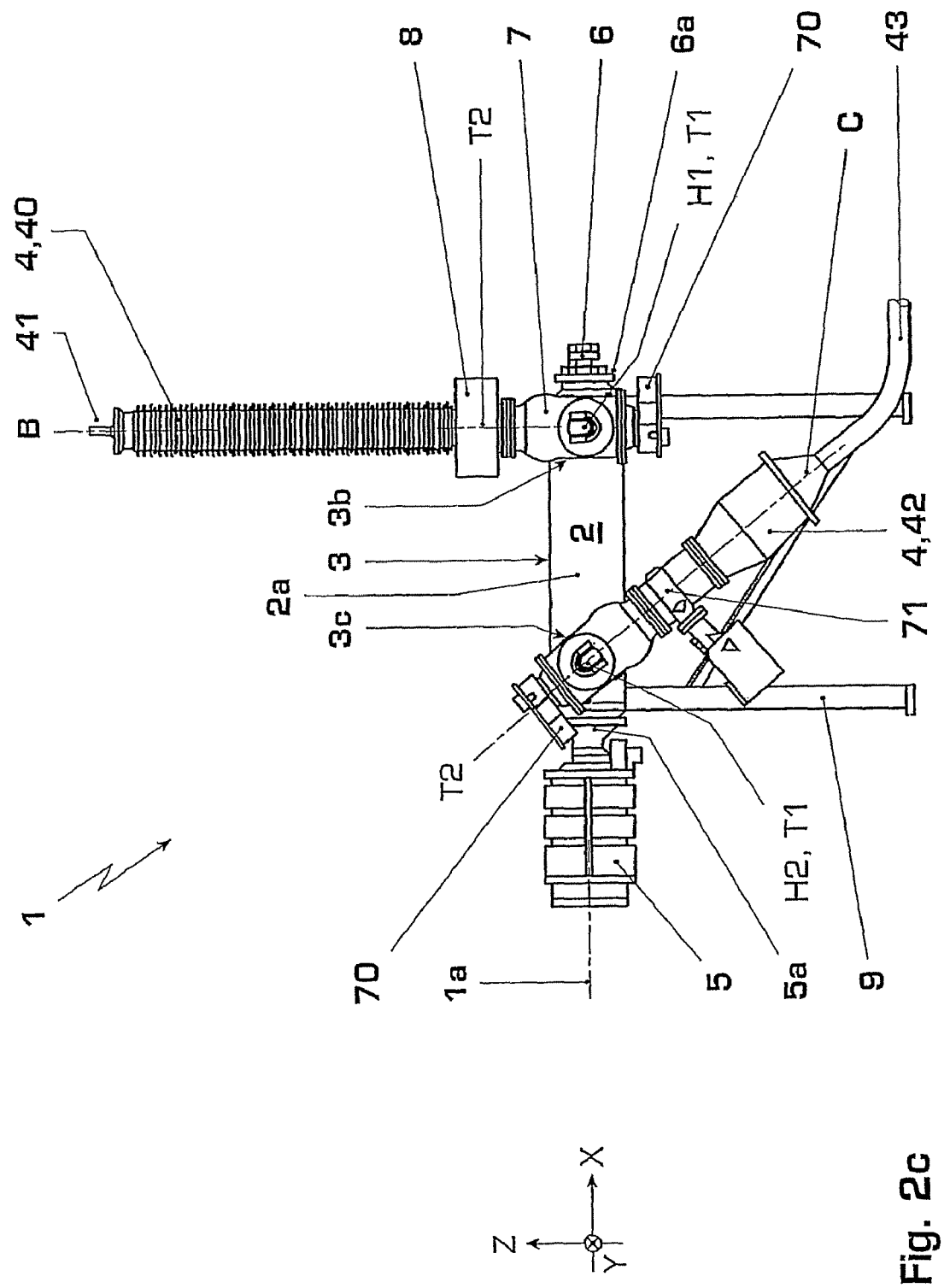
Figure 3:
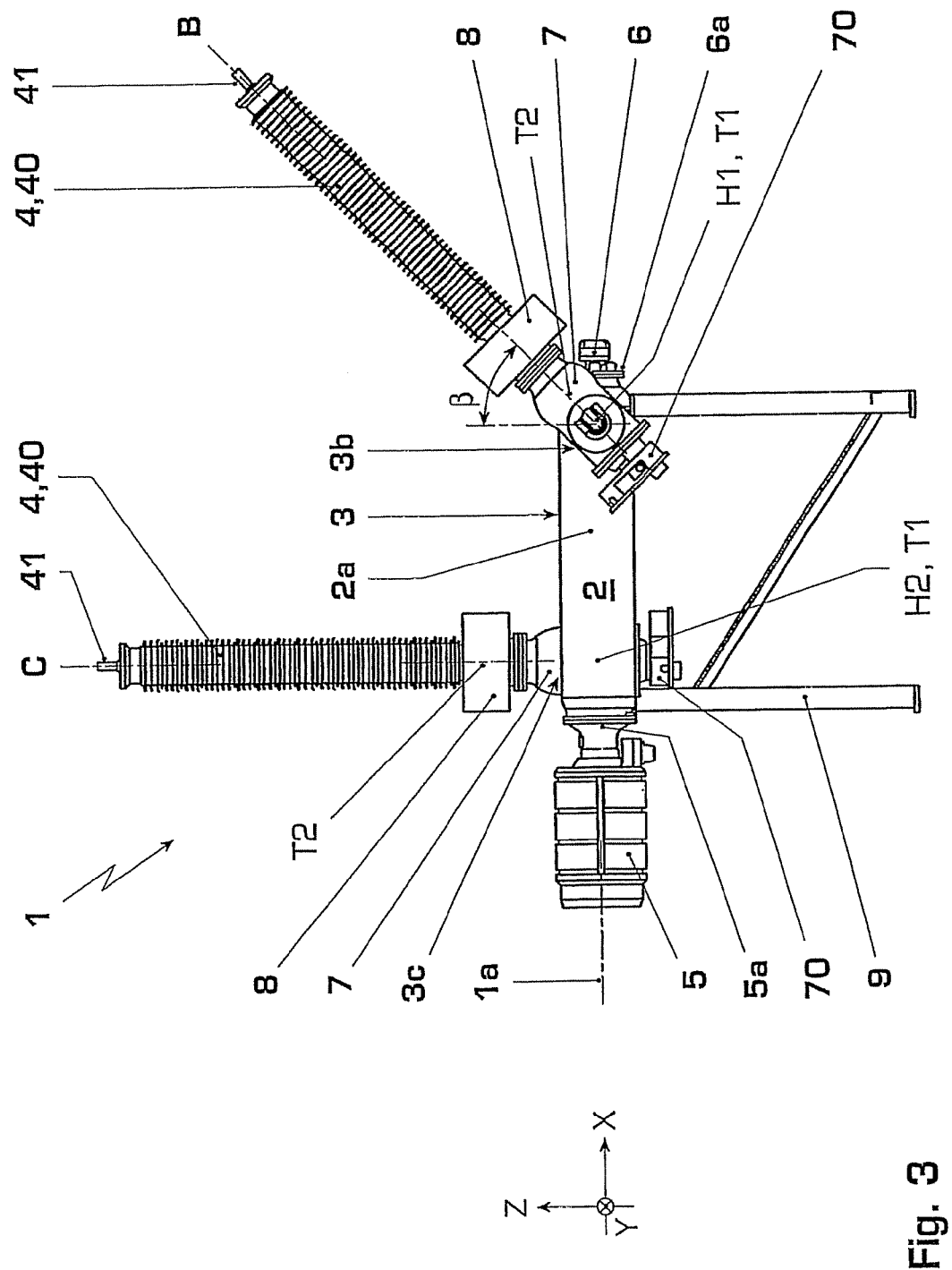
FIG. 3 shows a third embodiment of the switching device with flange-connection on both sides of two outgoing feeders.

As is shown in a plan view in FIG. 2b and FIG. 4b, the switching device 1 can be single-phase-encapsulated, and three phases of such switching devices 1 can be arranged in parallel next to one another. In this case, the angle disconnectors 7 are preferably driven via a common drive rod 10 by a common disconnector drive 70. This common disconnector drive 10, 70 which is known per se can therefore also be implemented in the disclosure, i.e. in the case of angle disconnectors 7 which are flange-connected laterally in accordance with the disclosure and are possible tilted, for outdoor bushings 4, 40; B, C, D, and for outgoing cables 4, 42; C.

Also disclosed is a switch arrangement 1b with at least one electrical switching device 1. In this case, an encapsulated angle disconnector 7 is fitted on at least one switching device 1 in accordance with the disclosure between the mantle-side electrical connection 3b, 3c, 3d and the outgoing feeder 4; 40, 42, the input axis T1 of the angle disconnector on the electrical connection side being parallel to the mid-axis H1, H2 and the output axis T2 of said angle disconnector 7 on the outgoing feeder side being parallel to a longitudinal axis B, C, D of the outgoing feeder 4; 40, 42, a disconnector plane T12 being defined by the input axis T2 and the output axis T2, and a disconnector angle α being enclosed between the input axis T1 and the output axis T2, through which disconnector angle α the electrical connection 3b, 3c, 3d is deflected in the operating position of the switching device 1 in the disconnector plane T12.

The switch arrangement 1b can be a single-busbar arrangement (see in this regard the switching device 1 shown in FIGS. 1-3), a double-busbar arrangement (see in this regard the switching device 1 shown in FIG. 4), a 1½ switch arrangement 1b (FIGS. 5-7), an H circuit or the like.

Figure 5A:
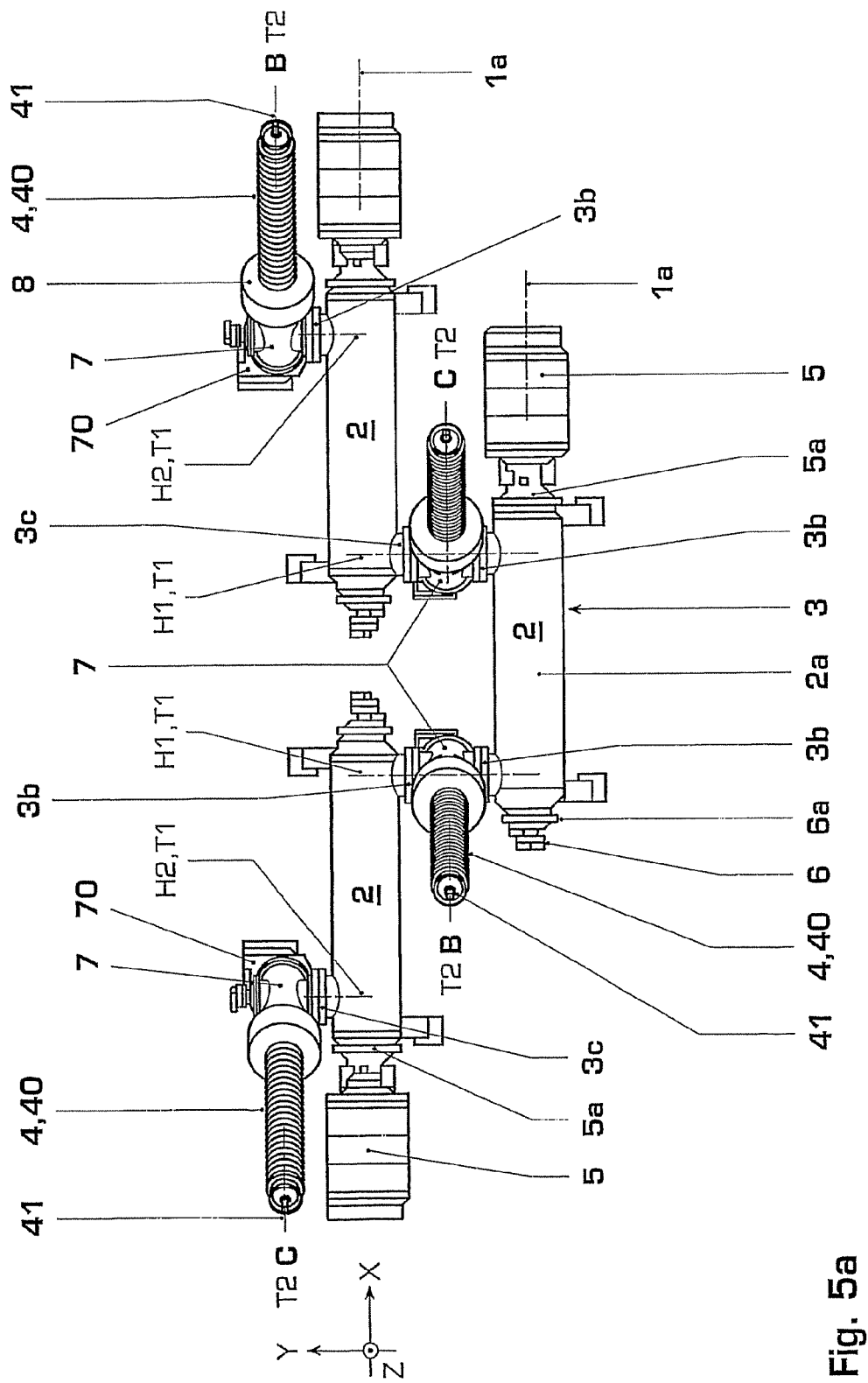
FIGS. 5a, 5b show a simplified 1½ switch arrangement in a plan view and in a side view.
Figure 5B:
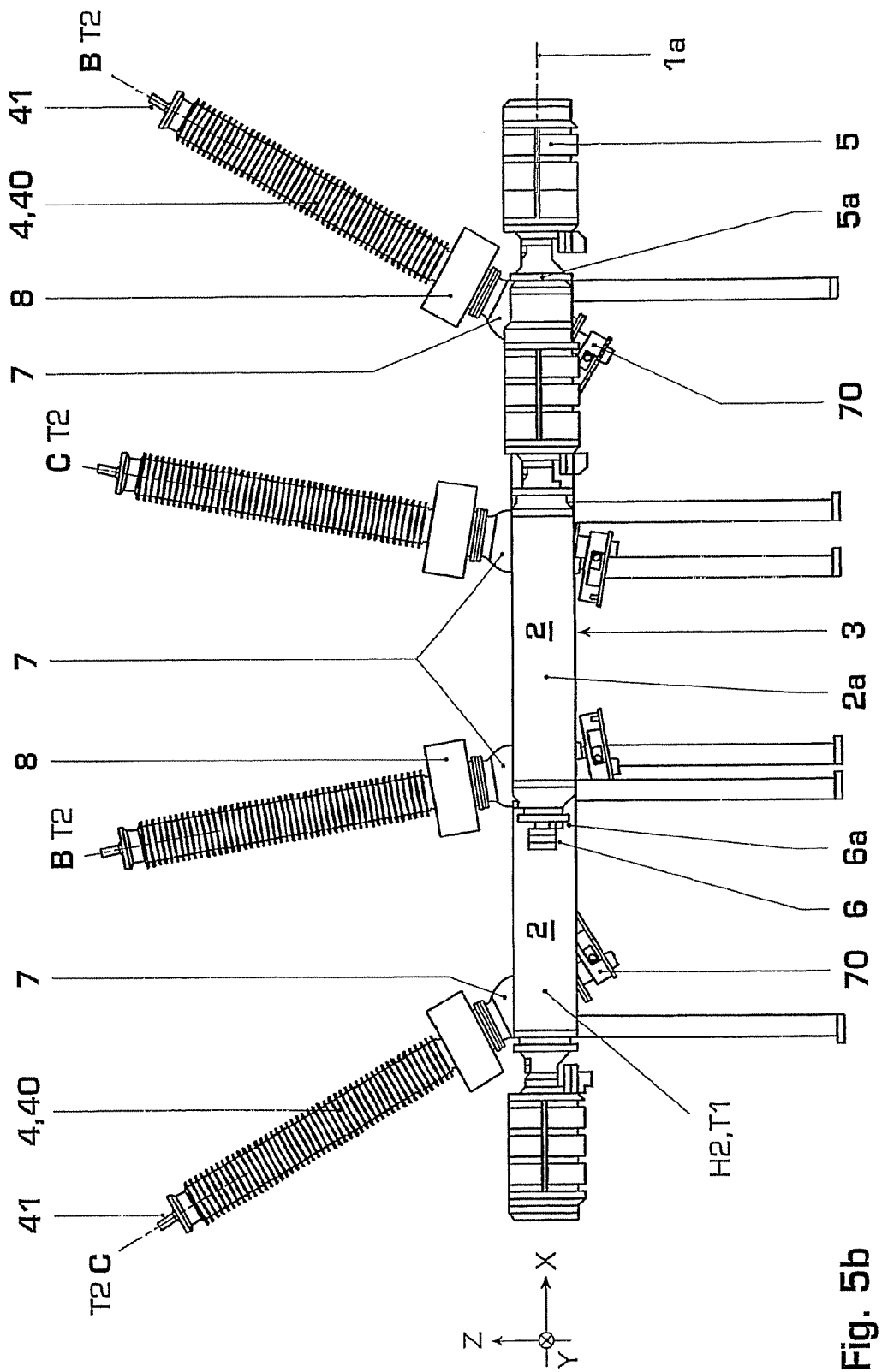
Figure 6:
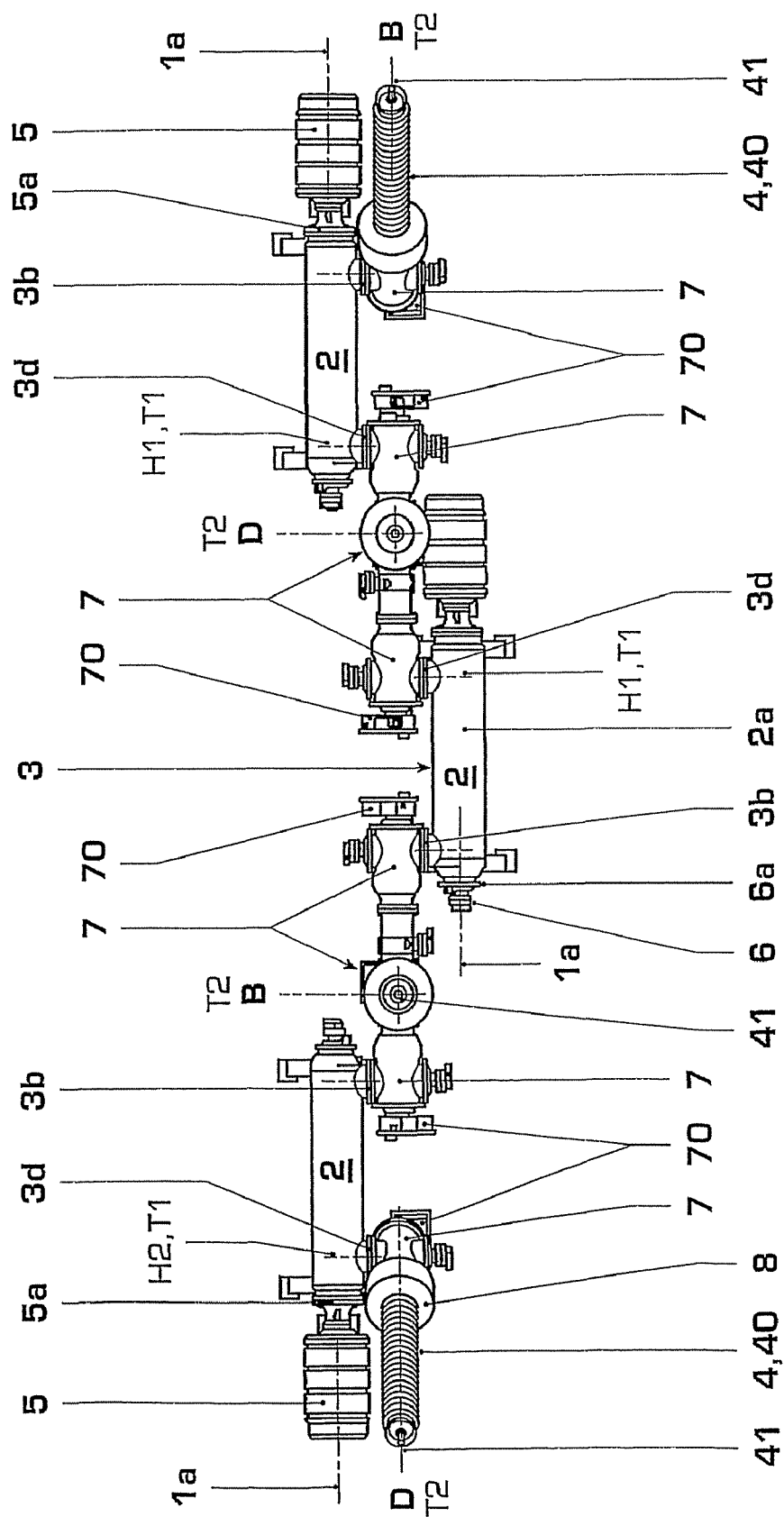
FIGS. 6, 7 show 1½ switch arrangements with mantle-side angle disconnector connections in a plan view.

As shown in FIGS. 5a, 5b, 6, an angle disconnector 7 can be provided, by means of which two circuit breakers 2 are connected to one another on the mantle side. An outgoing feeder 4, 40, 42 is flange-connected in accordance with the disclosure in such a way that it is bent back via the angle disconnector 7. In this case, the right-angled disconnector 7 has a T shape and has, along the input axis T1, a first disconnector opening 12, opposite this a third disconnector opening 14 and, along the output axis T2, a second disconnector opening 13. The first and third disconnector openings 12, 14 serve the purpose of connecting the two circuit breakers 2. The second disconnector opening 13 is used for the disconnectable outgoing feeder 4.

By way of example, in a 1½ switch arrangement 1b three switching devices are arranged horizontally and parallel to one another and are connected to one another via angle disconnectors 7.

As shown in FIGS. 5a, 5b, the central switching device 1 can be connected to the two other switching devices 1 via the angle disconnectors 7 at two mantle-side, horizontal electrical connections 3b, 3d, which are axially offset with respect to one another, the angle disconnectors 7 having a right-angled T shape and being connected, along their input axis T1, to the other switching devices 1 and being connected, along their output axis T2, in each case to an outgoing feeder 4; 40, 42, e.g., an outdoor bushing 4, 40 at the top or to an outgoing cable 4, 42 at the bottom. At least one of the angle disconnectors 7 can be connected directly and without the use of intermediate modules along its input axis T1 to the other switching devices 1 and along its output axis T2 to the outgoing feeder 4; 40, 42. As shown in FIG. 6, at least one of the angle disconnectors 7 can also be connected on both sides along its input axis T1 via in each case one further angle disconnector 7 to the other switching devices 1.

Figure 7:
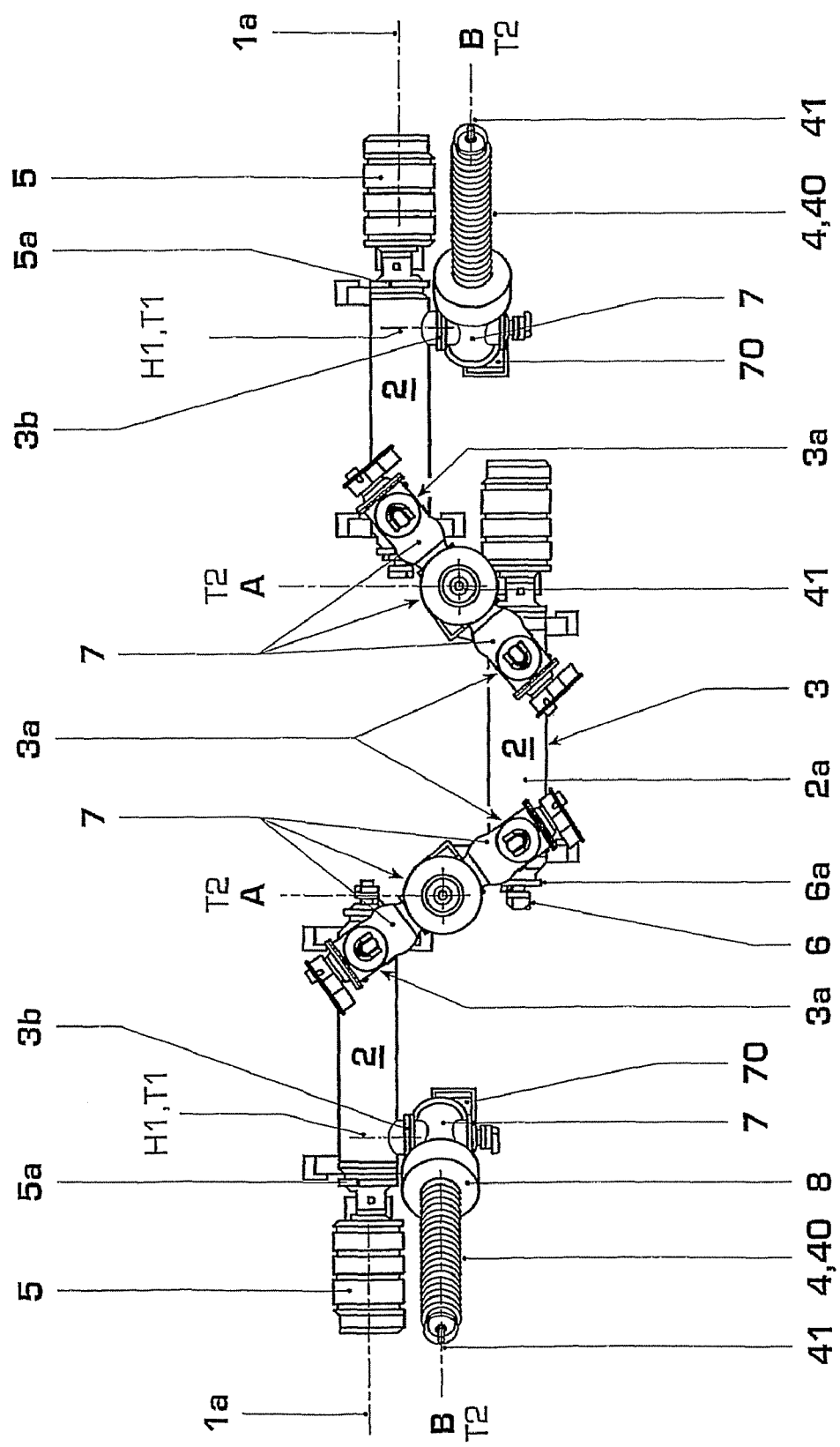

As shown in FIG. 7, the central switching device 1 can also be connected to the two other switching devices 1 via the angle disconnectors 7 at two mantle-side, vertical electrical connections 3a, which are axially offset with respect to one another, the angle disconnectors 7 in turn having a right-angled T shape and being connected along their input axis T1 via in each case one further angle disconnector 7 to the other switching devices 1 and being connected along their output axis T2 in each case to an outgoing feeder 4; 40, 42 at the top or at the bottom.

Figure 8:
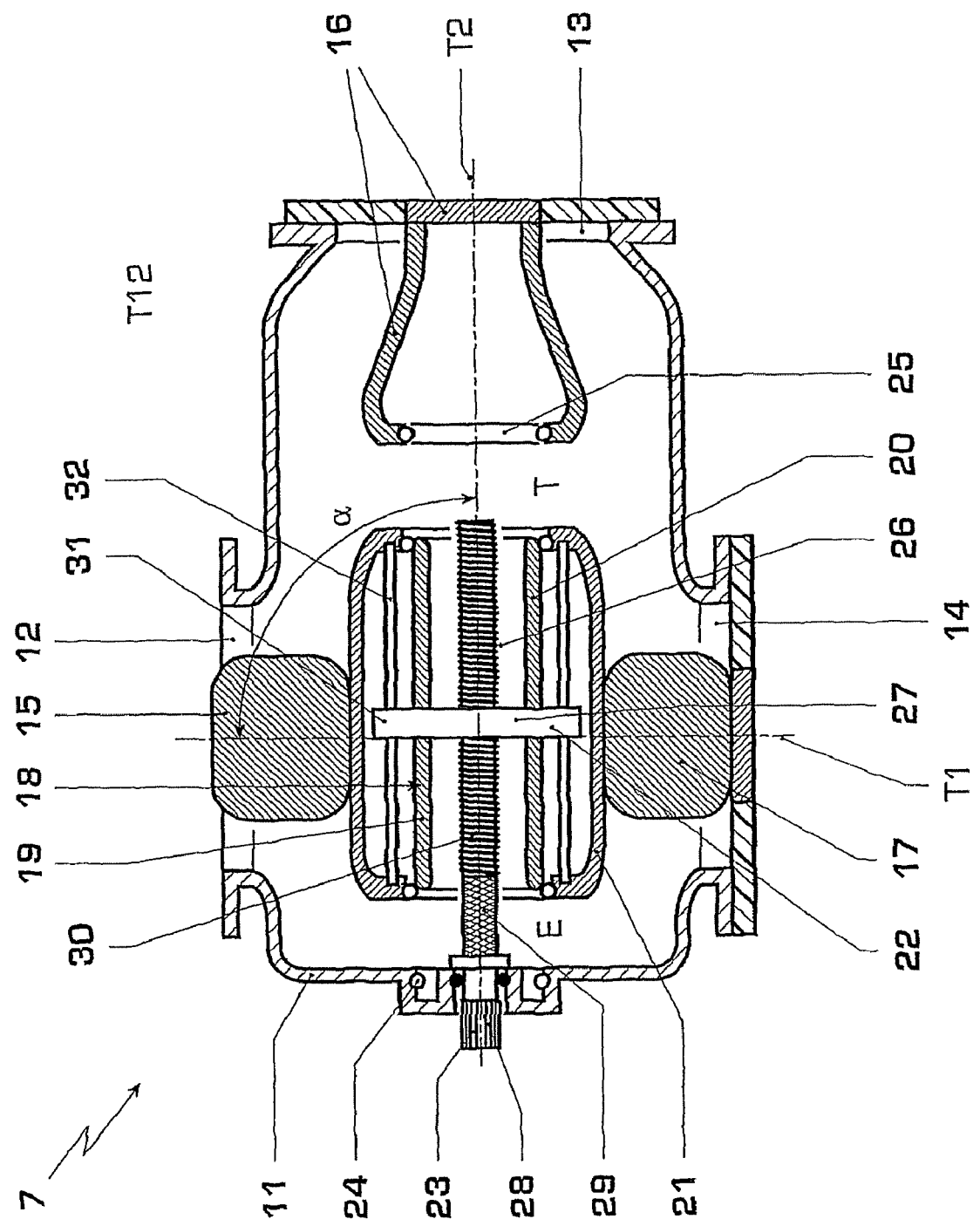
FIG. 8 shows an exemplary flange-connection module in the form of an encapsulated combination angle disconnector/grounding switch.

In another exemplary embodiment, the angle disconnector 7 is a standard combination disconnector 7 designed for gas-insulated switchgear assemblies. FIG. 8 shows, as a preferred example, a combination disconnector 7, which is the subject matter of EP 1 569 254 A1 mentioned at the outset, whose entire content is hereby incorporated in the description by reference. In detail the figure shows: in the angle disconnector housing 11, a first and necessarily a second disconnector opening 12, 13 along the input axis T1, a third disconnector opening 14 along the output axis T2, it being possible for the rolls of the input and output axis T1, T2 to be interchanged; disconnector electrical conductors 15, 16, 17 along the disconnector axes T1 and T2; a displaceable two-part contact element 18, which comprises a disconnector contact part 20 and/or a grounding-switch contact part 19; a tubular conductor 21 for accommodating the movable contact element 18; a holding element 22 for detachably fixing the disconnector contact part 20 and/or the grounding-switch contact part 19, which in this case are in the form of contact tubes 20, 19, with the holding element 22 being linearly displaceable via a disconnector driver 23, 70. Specifically, 23 denotes a disconnector drive shaft, 26 a threaded spindle, 27 a spindle nut, 28, 29 and 30 spindle sections, 31a sliding element and 32 at least one guide rail. Instead of a spindle drive, a linear thrust drive, a combination or another type of combination disconnector drive can also be implemented. The disconnector contact 25, when the disconnector section T is closed, serves the purpose of accommodating the disconnector contact part 20. The grounding contact 24, when the grounding switch section E is closed, serves the purpose of accommodating the grounding switch contact part 19. A particular advantage of this combination disconnector 7 consists in the fact that a disconnector and/or grounding-switch function can be implemented simply by fitting the disconnector contact part 20 and/or the grounding-switch contact part 19. Subsequent modification between the disconnector function, grounding switch function and the combination function by means of disassembling and/or refitting one of the contact parts 19, 20 is also possible in a very simple manner. A further significant advantage consists in the fact that the combination disconnector shown in FIG. 8 or EP 1 569 254 with a T shape with three disconnector openings 12, 13, 14 or with an L shape with only two disconnector openings 12, 13 or 14, 13 can be used, with the disconnector electrical conductor 17 or 15 being replaced by a cap (not illustrated) at the third or first disconnector opening 14 or 12 to be closed. An additional device or the like could also be flange-connected there.

All of the disconnectors 7 of the switching devices 1 (FIGS. 1-4) and the switch arrangements 1b (FIGS. 5-7) can be selected as right-angled disconnectors 7 as shown in FIG. 8.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE SYMBOLS 1 electrical switching device, high-voltage circuit breaker, heavy-duty switch
1a central axis, switch axis, longitudinal axis
1b switch arrangement
2 circuit breaker, interrupter unit, switching chamber
2a mantle face of switch housing
3 housing of circuit breaker, switch housing
3a-3d mantle-side connection flange
4 outgoing feeder
40 outdoor bushing
41 high-voltage terminal
42 outgoing cable
43 cable
5 switch drive
5a end-side connection flange (for drive)
6 pressure relief valve
6a end-side connection flange
7 right-angled disconnector, right-angled module with disconnector and/or grounding switch function, right-angled combination disconnector
70 disconnector/grounding switch drive
71 fast-acting grounding switch
8 current transformer
9 mounting frame, concrete pedestal
10 drive rod assembly for common disconnector drive
11 angle disconnector housing
12, 13, 14 disconnector openings
15, 16, 17 disconnector electrical conductor
18 contact element, two-part contact tube
19 grounding-switch contact part
20 disconnector contact part
21 conductor tube
22 holding element
23 disconnector drive shaft
24 grounding contact
25 disconnector contact
26 threaded spindle
27 spindle nut
28, 29, 30 spindle sections
31 sliding element
32 guide rail
A, B, C, D longitudinal axes of outgoing feeders
H1, H2 mid-axis of mantle-side, non-vertical electrical connections
E grounding switch
T disconnector
T1, T2 disconnector axes
T1 input axis
T2 output axis
T12 disconnector plane
x, y, z Cartesian coordinates
α disconnector angle
β rotation angle, tilting angle for outgoing feeders
γ position angle for mantle-side electrical connection

What is claimed is:

1. An electrical switching device comprising:
a circuit breaker, which is arranged in a housing that extends along a longitudinal axis; and
at least one mantle-side electrical connection an external mantle face of the housing for connecting an outgoing feeder and having a mid-axis which, in an operating position of the switching device, has a horizontal component, wherein:
a) an encapsulated angle disconnector, whose input axis on an electrical-connection side is positioned parallel to the mid-axis and whose output axis on an outgoing-feeder side is positioned parallel to a longitudinal axis of the outgoing feeder, is fitted between the mantle-side electrical connection and the outgoing feeder; and
b) a disconnector plane is defined by the input axis and the output axis, and a disconnector angle (α) is enclosed between the input axis and the output axis, through which angle the mantle-side electrical connection is deflected in the operating position of the switching device in the disconnector plane.

2. The electrical switching device as claimed in claim 1, wherein the disconnector is fitted directly and without intermediate modules on the input axis at the mantle-side electrical connection and on the output axis at the outgoing feeder.

3. The electrical switching device as claimed in claim 2, wherein the outgoing feeder is an outdoor bushing and the mantle-side electrical connection is deflected through the disconnector angle (α) in the disconnector plane upwards towards a vertical relative to the horizontal component.

4. The electrical switching device as claimed in claim 2, wherein the outgoing feeder is an outgoing cable, and the mantle-side electrical connection is deflected through the disconnector angle (α) in the disconnector plane downwards towards a vertical relative to the horizontal component.

5. The electrical switching device as claimed in claim 2, wherein the mid-axis encloses a position angle (γ) with a vertical relative to the horizontal component and:
a) the position angle (γ) is in the range of $30° < \gamma < 150°$; and/or
b) the disconnector angle (α) is in the range of $30° < \alpha < 150°$.

6. The electrical switching device as claimed in claim 1, wherein the mantle-side electrical connection is deflected through the disconnector angle (α) in the disconnector plane towards a vertical relative to the horizontal component.

7. The electrical switching device as claimed in claim 1, wherein the outgoing feeder is an outdoor bushing and the mantle-side electrical connection is deflected through the disconnector angle (α) in the disconnector plane upwards towards a vertical relative to the horizontal component.

8. The electrical switching device as claimed in claim 1, wherein the outgoing feeder is an outgoing cable, and the mantle-side electrical connection is deflected through the disconnector angle (α) in the disconnector plane downwards towards a vertical relative to the horizontal component.

9. The electrical switching device as claimed in claim 1, wherein the mid-axis encloses a position angle (γ) with a vertical relative to the horizontal component; and
a) the position angle (γ) is in a range of $30° < \gamma < 150$; and
b) the disconnector angle (α) is in a range of $30° < \alpha < 150°$.

10. The electrical switching device as claimed in claim 9, wherein the disconnector angle (α) and the position angle (γ) are matched to one another such that the outgoing feeder is guided away with respect to the vertical at an angle of maximal 60°.

11. The electrical switching device as claimed in claim 10, wherein:
a) for an outgoing feeder with an outdoor bushing, a sum of the disconnector angle (α) and the position angle (γ) is in a range of $130° < \alpha + \gamma < 230°$; and/or b) for an outgoing feeder with an outgoing cable, a sum of the disconnector angle (α) and the position angle (γ) is in a range of −50°<α−γ<50°.

12. The electrical switching device as claimed in claim 9, wherein the disconnector angle (α) and the position angle (γ) are matched to one another such that the outgoing feeder is guided away with respect to the vertical at an angle of maximal 30°.

13. The electrical switching device as claimed in claim 1, wherein:
a) for an outgoing feeder with an outdoor bushing, a sum of the disconnector angle (α) and the position angle (γ) is in a range of 130°<α+γ<230; and
b) for an outgoing feeder with an outgoing cable, a sum of the disconnector angle (α) and the position angle (γ) is in a range of −50°<α−γ<50°.

14. The electrical switching device as claimed in claim 13, wherein:
a) the angle disconnector is fitted fixedly with a rotated orientation on the mantle-side electrical connection, a rotation angle (β) between the disconnector plane and a vertical reference plane being predetermined by the input axis; and
b) wherein the rotation angle (β) is in a range 0°<|β|<70; and
c) wherein, for an outgoing cable, the rotation angle (β) is in a range of 110°<|β|<180°, preferably 130°<|β|<180°.

15. The electrical switching device as claimed in claim 1, wherein:
a) the angle disconnector is fitted fixedly with a rotated orientation on the mantle-side electrical connection, a rotation angle (β) between the disconnector plane and a vertical reference plane being predetermined by the input axis; and
b) wherein the rotation angle (β) is in a range 0°<|β|<70°; and
c) wherein, for an outgoing cable, the rotation angle (β) is in a range of 110°<|β|<180°.

16. The electrical switching device as claimed claim 15, wherein a plurality of mantle-side, non-vertical electrical connections are provided and are each connected via angle disconnectors directly to at least one of an outgoing feeder having an outdoor bushing or outgoing cable.

17. The electrical switching device as claimed in claim 1, wherein a plurality of mantle-side, non-vertical electrical connections are provided and are each connected via angle disconnectors directly to at least one of an outdoor bushing or outgoing cable.

18. The electrical switching device as claimed in claim 17, wherein:
a) the mantle-side, non-vertical electrical connections are arranged offset with respect to one another along the longitudinal axis and/or;
b) the mantle-side, non-vertical electrical connections are arranged with respect to a vertical longitudinal plane through the housing of the switching device on mutually opposite sides.

19. The electrical switching device as claimed in claim 18, wherein:
a) at least one mantle-side, vertical connection for outdoor bushings or for additional devices is provided; and/or
b) at least one end-side connection for outdoor bushings or for additional devices is provided.

20. The electrical switching device as claimed in claim 1, wherein:
a) at least one mantle-side, vertical connection for outdoor bushings or for additional devices is provided; and/or
b) at least one end-side connection for outdoor bushings or for additional devices is provided.

21. The electrical switching device as claimed in claim 20, wherein:
a) the switching device is single-phase-encapsulated and three phases of the switching devices are arranged in parallel with one another; and
b) plural angle disconnectors are driven via a common drive rod by a common disconnector drive.

22. The electrical switching device as claimed in claim 1, wherein:
a) the switching device is single-phase-encapsulated and three phases of the switching device is arranged in parallel with one another; and
b) plural angle disconnectors are driven via a common drive rod by a common disconnector drive.

23. The electrical switching device as claimed in claim 22, wherein:
a) the longitudinal axis of the housing is horizontal; and
b) a cross-sectional profile of the housing is shaped so as to be entirely or partially round, oval, rectangular or polygonal.

24. The electrical switching device as claimed in claim 1, wherein:
a) the longitudinal axis of the housing is horizontal; and
b) a cross-sectional profile of the housing is shaped so as to be entirely or partially round, oval, rectangular or polygonal.

25. The electrical switching device as claimed in claim 24, wherein:
a) the switching device is a high-voltage circuit breaker or a heavy-duty switch; and/or
b) the switching device is a dead tank breaker, an AIS/GIS hybrid switch, or a GIS switch with an outdoor outgoing feeder or outgoing cable.

26. The electrical switching device as claimed in claim 1, wherein:
a) the switching device is a high-voltage circuit breaker or a heavy-duty switch; and/or
b) the switching device is a dead tank breaker, an AIS/GIS hybrid switch, or a GIS switch with an outdoor outgoing feeder or outgoing cable.

27. The electrical switching device as claimed in claim 26, wherein:
a) the angle disconnector is a combination disconnector for a gas-insulated switchgear assembly and has a displaceable two-part contact element with a disconnector contact part and/or a grounding-switch contact part; and
b) wherein the disconnector contact part and/or the grounding-switch contact part are contact tubes, which are fixed detachably on a holding element, and the holding element is linearly displaceable via a disconnector drive.

28. The electrical switching device as claimed in claim 1, wherein:
a) the angle disconnector is a combination disconnector for a gas-insulated switchgear assembly and has a displaceable two-part contact element with a disconnector contact part and/or a grounding-switch contact part; and
b) wherein the disconnector contact part and/or the grounding-switch contact part are contact tubes, which are fixed detachably on a holding element, and the holding element is linearly displaceable via a disconnector drive.

29. The electrical switching device as claimed in claim 28 in combination with a switching arrangement, wherein plural disconnectors each have, along their input axis, a first disconnector opening and, along their output axis, a second disconnector opening and, opposite the first disconnector opening a third disconnector opening.

30. The electrical switching device as claimed claim 28, wherein:
   a) the mid-axis of the mantle-side electrical connection of the circuit breaker is lying in the horizontal; and
   b) the disconnector angle ($\alpha$) is in a range of $80°<\alpha<100°$.

31. The electrical switching device as claimed claim 1, wherein:
   a) the mid-axis of the mantle-side electrical connection of the circuit breaker is lying in the horizontal; and
   b) the disconnector angle ($\alpha$) is in the range of $80°<\alpha<100°$.

32. The electrical switching device as claimed in claim 31, wherein:
   a) the angle disconnector has a T shape, in which a first disconnector opening is provided along the input axis and, opposite this, a third disconnector opening is provided and a second disconnector opening is provided along the output axis; and
   b) wherein the angle disconnector has a right-angled T shape, in which the output axis is at a right angle with respect to the input axis, and the disconnection path and/or grounding path is or are arranged along the output axis.

33. The electrical switching device as claimed in claim 31, in combination with a switching arrangement comprising plural switching devices.

34. The electrical switching device as claimed in claim 1, wherein:
   a) the angle disconnector has a T shape, in which a first disconnector opening is provided along the input axis and, opposite this, a third disconnector opening is provided and a second disconnector opening is provided along the output axis; and
   b) wherein the angle disconnector has a right-angled T shape, in which the output axis is at a right angle with respect to the input axis, and a disconnection path and/or grounding path is or are arranged along the output axis.

35. The electrical switching device as claimed in claim 34, comprising
   two circuit breakers connected to one another on a mantle side.

36. The electrical switching device as claimed in claim 35 in combination with a switching arrangement, wherein:
   a) three switching devices connected to one another via angle disconnectors in a 1½ switch arrangement; and
   b) wherein the switching devices are arranged horizontally and parallel to one another.

37. A switch arrangement comprising at least one electrical switching device configured as claimed in claim 1.

38. The switch arrangement, as claimed in claim 37, comprising:
   a) three switching devices connected to one another via angle disconnectors in a 1½ switch arrangement; and
   b) wherein the switching devices are arranged horizontally and parallel to one another.

39. The switch arrangement as claimed in claim 38, wherein:
   a) a central switching device of the three switching devices is connected to the two other switching devices via the angle disconnectors, at two mantle-side, horizontal electrical connections, which are axially offset with respect to one another; and
   b) the angle disconnectors have a right-angled T shape and are connected to the other switching devices along their input axis and are each connected along their output axis to an outgoing feeder or an outdoor bushing towards a top or to an outgoing cable towards a bottom of the switching arrangement.

40. The switch arrangement as claimed in claim 39, wherein:
   a) at least one of the angle disconnectors is connected directly, without intermediate modules, along its input axis to the other switching devices and along its output axis to the outgoing feeder; and/or
   b) at least one of the angle disconnectors is connected on both sides along its input axis via in each case one further angle disconnector to the other switching devices.

41. The switch arrangement as claimed in claim 38, wherein:
   a) at least one of the angle disconnectors is connected directly, without intermediate modules, along its input axis to the other switching devices and along its output axis to the outgoing feeder; and/or
   b) at least one of the angle disconnectors is connected on both sides along its input axis to the other switching devices in each case via one further angle disconnector.

42. The switch arrangement as claimed in claim 38, wherein:
   a) a central switching device of the three switching devices is connected via the angle disconnectors to the two other switching devices at two mantle-side, vertical electrical connections, which are axially offset with respect to one another; and
   b) the angle disconnectors have a right-angled T shape and are connected along their input axis to the other switching devices in each case via one further angle disconnector and along their output axis in each case to an outgoing feeder towards a top or towards a bottom.

43. The electrical switching device as claimed in claim 1, wherein the mid-axis encloses a position angle ($\gamma$) with a vertical relative to the horizontal component; and
   a) the position angle ($\gamma$) is 90°; and
   b) the disconnector angle ($\alpha$) is 90°.

44. The electrical switching device as claimed in claim 1, wherein:
   a) for an outgoing feeder with an outdoor bushing, a sum of the disconnector angle ($\alpha$) and the position angle ($\gamma$) is 180°; and
   b) for an outgoing cable, a sum of the disconnector angle ($\alpha$) and the position angle ($\gamma$) is 0°.

45. The electrical switching device as claimed in claim 1, wherein:
   a) the angle disconnector is fitted fixedly with a rotated orientation on the mantle-side electrical connection, a rotation angle ($\beta$) between the disconnector plane and a vertical reference plane being predetermined by the input axis, and
   b) wherein the rotation angle ($\beta$) is determined by the angular spacing on a pitch circle mounting flange; and
   c) wherein, for an outgoing cable, the rotation angle ($\beta$) is in a range of $150°<|\beta|<180°$.

* * * * *